US012767336B2

(12) United States Patent
Belleville

(10) Patent No.: US 12,767,336 B2
(45) Date of Patent: Oct. 20, 2026

(54) HYBRID AIRCRAFT POWER PLANT AND GEARBOX THEREFOR

(71) Applicant: PRATT & WHITNEY CANADA CORP., Longueuil (CA)

(72) Inventor: François Belleville, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 78 days.

(21) Appl. No.: 18/423,848

(22) Filed: Jan. 26, 2024

(65) Prior Publication Data

US 2025/0242928 A1 Jul. 31, 2025

(51) Int. Cl.

| | |
|---|---|
| ***B64D 27/02*** | (2006.01) |
| ***B64D 35/08*** | (2025.01) |
| ***F02N 15/02*** | (2006.01) |
| ***F02N 15/04*** | (2006.01) |

(52) U.S. Cl.

CPC ......... *B64D 27/026* (2024.01); *F02N 15/023* (2013.01); *F02N 15/046* (2013.01)

(58) Field of Classification Search

CPC .... B64D 27/026; F02N 15/023; F02N 15/046

See application file for complete search history.

(56) References Cited

U.S. PATENT DOCUMENTS

| | | | | |
|---|---|---|---|---|
| 10,371,066 | B2 | 8/2019 | Steinwandel | |
| 11,639,228 | B2 | 5/2023 | Becker et al. | |
| 11,686,253 | B2 | 6/2023 | Lefebvre | |
| 11,745,888 | B2 | 9/2023 | Harvey | |
| 2015/0285165 | A1 | 10/2015 | Steinwandel | |
| 2020/0158213 | A1 | 5/2020 | Leque | |
| 2021/0179286 | A1* | 6/2021 | Harvey | B64D 27/10 |
| 2022/0033097 | A1 | 2/2022 | Botti et al. | |
| 2022/0297844 | A1 | 9/2022 | Mackin et al. | |
| 2022/0324582 | A1* | 10/2022 | LaTulipe | F02C 7/36 |
| 2023/0137264 | A1 | 5/2023 | Latulipe | |
| 2023/0366344 | A1 | 11/2023 | Latulipe | |

FOREIGN PATENT DOCUMENTS

| | | | | |
|---|---|---|---|---|
| CN | 108082500 A * | 5/2018 | | B64D 27/02 |
| WO | WO-2016083720 A1 * | 6/2016 | | B64D 27/10 |

* cited by examiner

*Primary Examiner* — Tinh T Dang

(74) *Attorney, Agent, or Firm* — Norton rose fulbright Canada LLP

(57) ABSTRACT

The hybrid aircraft power plant can have an output shaft connectable to a load, the output shaft rotatable about an axis; a thermal engine having a thermal engine shaft coaxial with the output shaft; an electric motor having a rotor shaft coaxial with the output shaft; a first clutch operable to engage the thermal engine shaft with the output shaft; a second clutch operable to engage the rotor shaft with the output shaft; a third clutch operable to engage the thermal engine shaft with the rotor shaft; the first clutch, second clutch and third clutch disposed axially between the electric motor and the thermal engine, relative to the axis.

20 Claims, 3 Drawing Sheets

HYBRID AIRCRAFT POWER PLANT AND GEARBOX THEREFOR

TECHNICAL FIELD

The application relates generally to hybrid aircraft power plants and, more particularly, to architectures thereof.

BACKGROUND OF THE ART

Hybrid aircraft power plants that include a thermal engine and an electric motor for propelling aircraft can provide operational advantages. However, there are several challenges along the path to fully harnessing this potential. Indeed, power plant design factors in various considerations, such as limiting production cost and maintenance costs, which may benefit from a design having a lower number of different parts (e.g., part numbers). Moreover, in the case of aircraft applications, there is a concern for increased reliability, volume reduction and weight reduction than in ground-based applications.

SUMMARY

In one aspect, there is provided a hybrid aircraft power plant comprising: an output shaft connectable to a load, the output shaft rotatable about an axis; a thermal engine having a thermal engine shaft coaxial with the output shaft; an electric motor having a rotor shaft coaxial with the output shaft; a first clutch operable to engage the thermal engine shaft with the output shaft; a second clutch operable to engage the rotor shaft with the output shaft; a third clutch operable to engage the thermal engine shaft with the rotor shaft; and the first clutch, second clutch and third clutch disposed axially between the electric motor and the thermal engine, relative to the axis.

In another aspect, there is provided an aircraft power plant comprising: an output shaft connected to an air mover, the output shaft rotatable about an axis; a thermal engine having a thermal engine shaft; an electric motor having a rotor shaft; a first clutch operable to engage the thermal engine shaft with the output shaft, the first clutch being a passive one-way clutch; a second clutch operable to engage the rotor shaft with the output shaft, the second clutch being a passive one-way clutch; and the first clutch and second clutch disposed axially between the electric motor and the thermal engine, relative to the axis.

In a further aspect, there is provided a gearbox for a hybrid engine, the gearbox comprising: a common housing; an output shaft extending into the common housing; a thermal engine shaft extending into the common housing, concentric to the output shaft; a rotor shaft extending into the common housing, concentric to the output shaft; a first clutch disposed in the common housing and operable to engage the thermal engine shaft with the output shaft; a second clutch disposed in the common housing and operable to engage the rotor shaft with the output shaft; and a third clutch disposed in the common housing and operable to engage the thermal engine shaft with the rotor shaft.

DESCRIPTION OF THE DRAWINGS

Reference is now made to the accompanying figures in which.

DETAILED DESCRIPTION

In this specification, the term "connected" may include both direct connection (in which two elements that are connected to each other contact each other) and indirect connection (in which at least one additional element is located between the two elements). Similarly, the terms "coupled" and "engaged" may include both direct coupling or engagement (in which two elements that are coupled to each other contact each other) and indirect connection (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
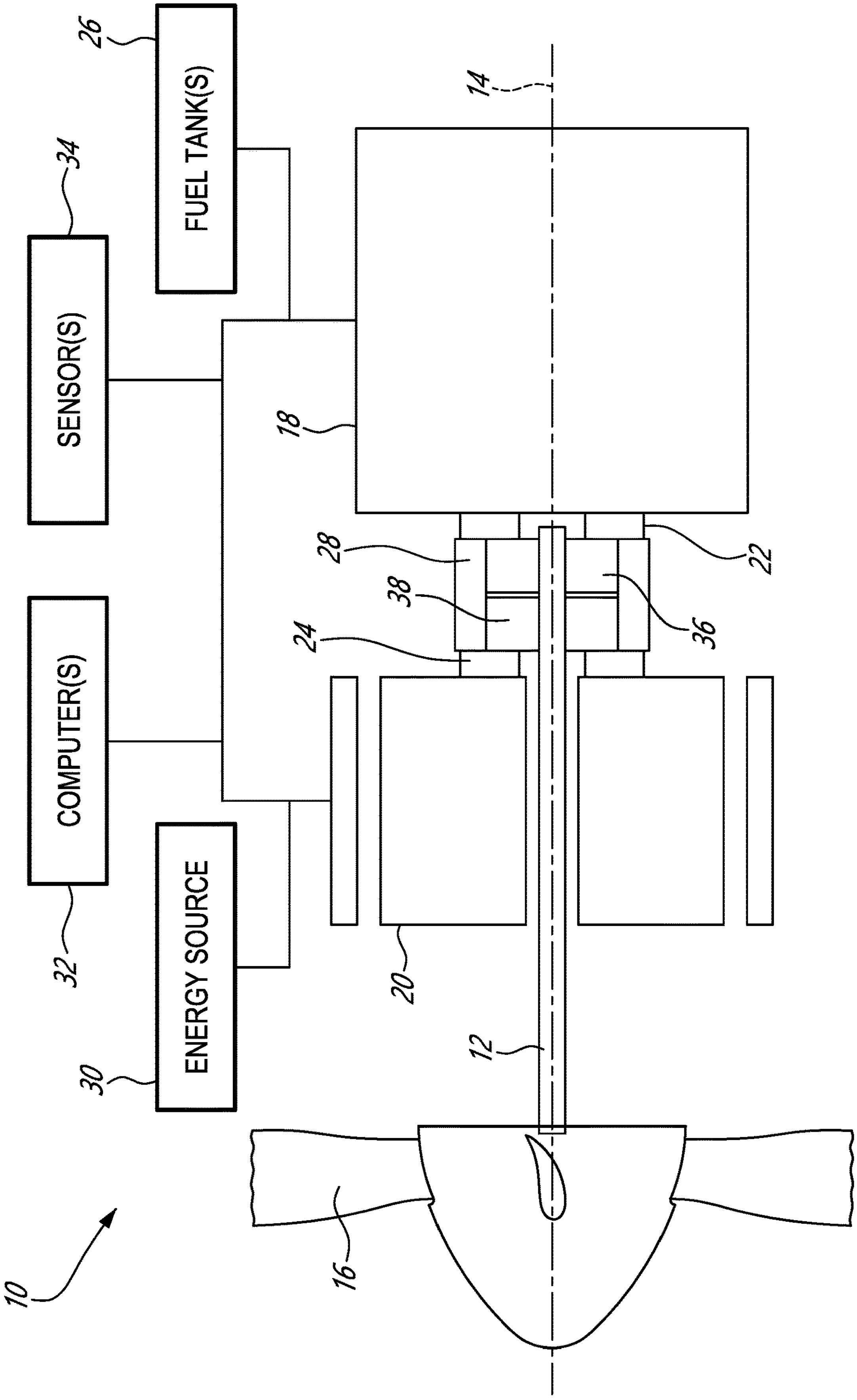
FIG. 1 is a schematic representation of an exemplary hybrid power plant.

FIG. 1 is a schematic illustration of an exemplary configuration of power plant 10 being drivingly connected to propeller 16. The propeller 16 is non-limiting example of a suitable air mover or load. In this example, the power plant 10 is drivingly connected to propeller 16 via an output shaft 12. The output shaft 12 rotates about an axis 14. Propeller 16 may be a variable pitch propeller. Power plant 10 may include one or more thermal engines 18 (referred hereinafter in the singular) and one or more electric motors 20 (referred hereinafter in the singular). In an embodiment of power plant 10, thermal engine 18 and electric motor 20 may be arranged in parallel and each be selectively operable to drive the propeller 16 or not independently from the other. More specifically, in the example presented in FIG. 1, the thermal engine 18 has a thermal engine shaft 22, and the electric motor 20 has a rotor shaft 24. A first clutch 36 is operable to engage (or disengage) the thermal engine shaft 22 with (or from) the output shaft 12, and a second clutch 38 is operable to engage (or disengage) the rotor shaft 24 with (or from) the output shaft 12. The second clutch 38 can operate independently of the first clutch 36.

It will be noted in this embodiment that the thermal engine shaft 22 is coaxial with the output shaft 12 and with the rotor shaft 24. The first clutch 36 and the second clutch 38 are disposed axially between the electric motor 20 and the thermal engine 18, relative the axis. In this exemplary configuration, the electric motor 20 surrounds the output shaft 12 and axially overlaps with the output shaft 12. The output shaft 12 has two opposite ends which axially protrude from the electric motor 20 including a first end connected to the propeller 16 and a second end connected to the first clutch 36 and second clutch 38. The first end and the second end are on opposite sides of the electric motor 20 along the axis 14.

Thermal engine 18 may include a (e.g., continuous or intermittent) internal combustion engine. In various embodiments, thermal engine 18 may include a gas turbine engine, a rotary (e.g., Wankel) engine or a piston engine for example. Thermal engine 18 may generate first torque at thermal engine shaft 22 from the controlled combustion of a suitable fuel stored in fuel tank 26 and supplied to thermal engine 18.

In various embodiments, electric motor 20 may be a permanent magnet synchronous motor, a brushless direct-current (DC) electric motor, or an alternating-current (AC) motor for example. Electric motor 20 may generate torque at the rotor shaft 24 via the conversion of electric energy received from energy source 30. Energy source 30 may be a direct current (DC) electric source used to drive motor 20 via suitable power electronics (e.g., inverter) and motor controller. Energy source 30 may alternately or additionally have an alternating current (AC) electric source. Energy source 30 may include one or more batteries (e.g., battery bank) or supercapacitors for example. Energy source 30 may include one or more lithium-ion batteries, one or more nickel-metal hydride batteries and/or one or more lead-acid batteries to name some potential examples.

In some embodiments, energy source 30 may be rechargeable or otherwise have one or more rechargeable elements. For example, the operation of electric motor 20 as an electric generator may be used to recharge energy source 30 in some situations. In some embodiments, electric motor 20 may be used as a starter for the thermal engine 18.

In the exemplary embodiment presented, a third clutch 28 may be provided and be operable to engage (or disengage) the thermal engine shaft 22 with (or from) the rotor shaft 24. The third clutch 28 may be used to engage the thermal engine shaft 22 with the rotor shaft when using the electric motor 20 in regeneration mode rather than power delivery mode, for example, and/or when using the electric motor 20 as a starter for the thermal engine 18. The third clutch 28 can be disposed axially between the electric motor 20 and the thermal engine 18, relative to the axis, with the first clutch 36 and the second clutch 38.

In some embodiments, power plant 10 may be operated to manage the state-of-charge (SOC) of energy source 30 by the selective operation of electric motor 20 as a motor to draw energy from energy source 30 or as a generator to input energy into energy source 30. Alternatively or in addition, energy source 30 may be recharged using a ground-based source of electric power when aircraft 10 is on ground, such as an AC power supply.

In various embodiments, thermal engine 18 and electric motor 20 may be controlled by one or more controllers implemented by one or more computer(s) 32 (referred hereinafter in the singular). In some embodiments, thermal engine 18 and electric motor 20 may be operated either together or separately to drive propeller 16. In some embodiments, the operation of thermal engine 18 and/or electric motor 20 may be selected based on a phase of flight of aircraft and/or based on an action (e.g., maneuver) to be executed by aircraft. For example, in a phase of flight having a high power requirement, such as during a takeoff phase or a climb phase maneuver of aircraft, both thermal engine 18 and electric motor 20 may be used to cooperatively drive propeller 16. In a leveled cruise phase of flight, only thermal engine 18 may be used to drive propeller 16. During taxiing, i.e., the moving of the aircraft on the ground, at the airport, only electric motor 20 may be used to drive propeller 16.

Computer 32 may be operatively connected to control the operation of thermal engine 18 and output power from thermal engine 18 in part by controlling a fuel flow from fuel tank 26 to thermal engine 18 via a suitable fuel metering unit for example. Computer 32 may be operatively connected to control the operation of motor 20 and output power from thermal engine 18 in part by controlling a delivery of electric current from energy source 30 to thermal engine 18 via suitable power electronics for example.

Power plant 10 may include one or more sensors 34 operatively connected to energy source 30, electric motor 20, thermal engine 18, fuel tank 26, and/or to computer 32. In some embodiments, computer 32 may receive signals indicative of one or more parameters of energy source 30, electric motor 20, thermal engine 18 and/or fuel tank 26, via sensor(s) 34. The signals may be used by computer 32 to control the operation of electric motor 20, thermal engine 18, and/or assess a state of energy source 30, to name some examples. For example, sensor(s) 34 may include one or more voltage sensors, one or more current sensors, one or more torque sensor, one or more rotation speed sensor, and/or one or more temperature sensors.

Computer 32 may also receive inputs from the flight crew commanding the operation of power plant 10. Such inputs may be received from input devices actuatable by the flight crew and may include one or more buttons, switches and/or levers for example. In some embodiments, such input devices may include a throttle input device such as a throttle lever, which may also be referred to as a thrust lever or a power lever depending on the configuration of power plant 10. Throttle lever may be pivotable by the flight crew so that a throttle lever angle (TLA) may be indicative of a desired output power to be generated by power plant 10 and propeller 16. Computer 32 may control thermal engine 18 and/or motor 20 according to the TLA, and based on values measured via sensors 34, so that a desired amount of thrust may be produced via propeller 16.

In the exemplary embodiment presented in FIG. 1, the first clutch 36 directly connects the thermal engine shaft 22 to the output shaft 12, and the second clutch 38 directly connects the rotor shaft 24 to the output shaft.

The third clutch 28 may be an active clutch such as a friction clutch or a dog clutch. An active clutch may allow selective control over the engagement and disengagement, via a controller which may include a computer 32, either based on user input and/or a control scheme which may be in the form of computer readable instructions stored in a non-transitory memory of computer 32. A dog clutch may be mechanically simpler, more reliable, require less maintenance and/or be smaller and lighter.

The first clutch 36 and the second clutch 38 may be passive, one-way, clutches, i.e., overrunning (freewheel) clutches which disengage automatically when the output shaft 12 rotates faster than the respective one of the thermal engine shaft 22 and the rotor shaft 24. One potential advantage of overrunning clutches it that they do not need to be actively controlled, and therefore may avoid the necessity of using certain sensors, actuators, and/or control schemes. Overrunning clutches may also be mechanically simpler, more reliable, and/or have lower weight and volume than other types of clutches. There are different types of overrunning clutches, including sprag clutches, roller ramp clutches, wrap spring clutches, and wedge styles clutches.

Figure 2:
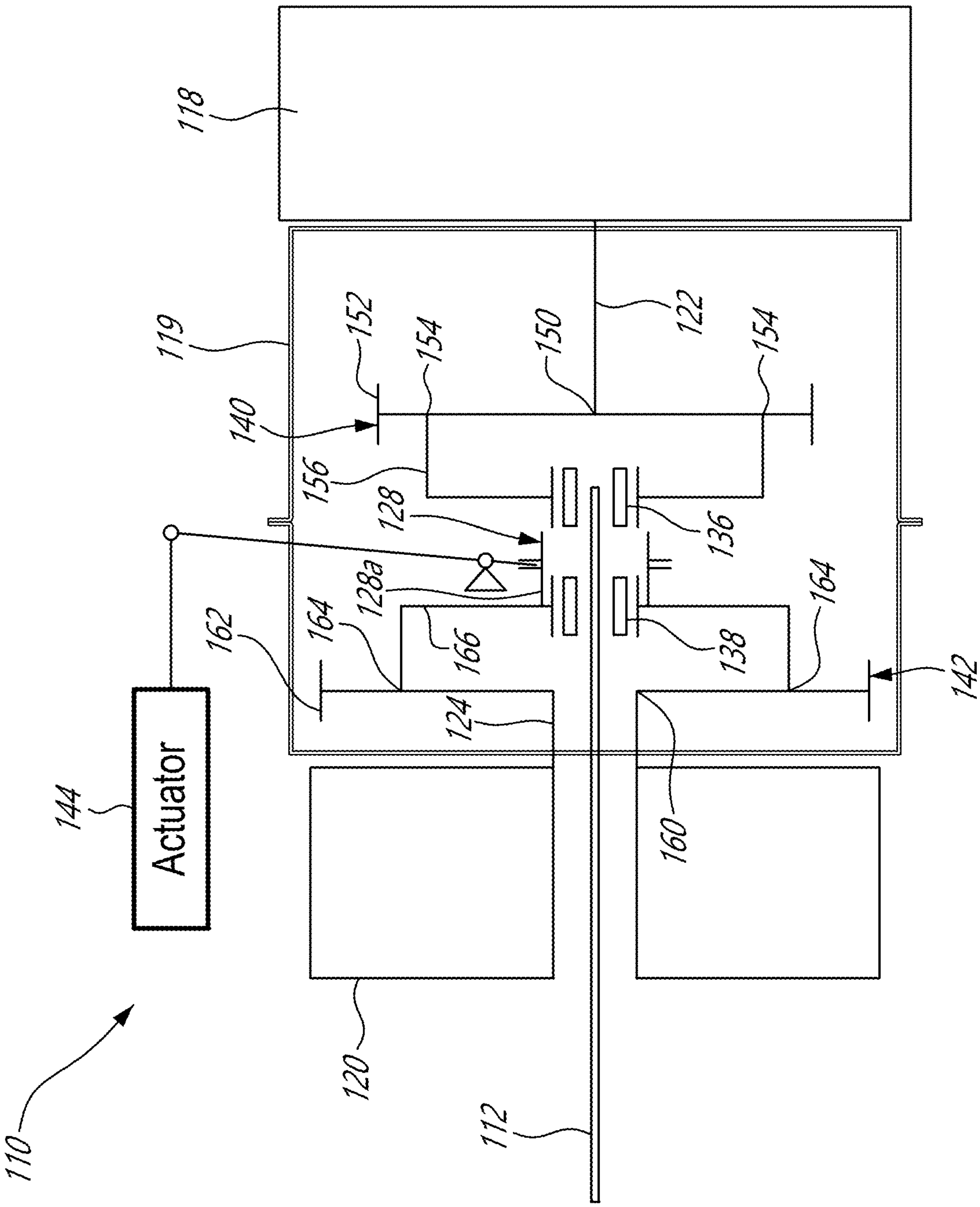
FIG. 2 is a schematic representation of an other exemplary hybrid power plant.

FIG. 2 presents an other example of a power plant 110 for an aircraft. In this example, the first clutch 136, second clutch 138 and third clutch 128 are disposed within a common housing 119 and can thus be said to be integrated to a same gearbox. In this example, during simultaneous operation of the electric motor 120 and of the thermal engine 118, the electric motor 120, and thermal engine 118, and the output shaft 112 may rotate at different speeds. This feature is accommodated by the presence of a first reduction gearing 140 coupled between the thermal engine 118 and the first clutch 136, and a second reduction gearing 138 coupled between the electric motor 120 and the second clutch 138. The first clutch 136 indirectly connects the thermal engine 118 to the output shaft 112, via the first reduction gearing 140, and the second clutch 138 indirectly connects the electric motor 120 to the output shaft 112, via the second reduction gearing 142. In this example, the first reduction gearing 140 and the second reduction gearing 142 are also located axially between the electric motor 120 and thermal engine 118, and further housed within the common housing 119. Accordingly, in this example, the first clutch 136 is operable to engage the thermal engine shaft 122 with the output shaft 111 via the first reduction gearing 140, and the second clutch is operable to engage the rotor shaft 124 to the output shaft 112 via the second reduction gearing. The third clutch 128, if present in an embodiment, may also be coupled between the first reduction gearing 140 and the second reduction gear 142, and may have components housed within the common housing 119.

For instance, in an embodiment, in a given condition of operation, the electric motor 120 may rotate at 15 000 RPM while driving the output shaft 112, the thermal engine 118 may rotate at 10 000 RPM while driving the output shaft 112. The first reduction gearing 140 may convert the 10000 RPM of the thermal engine shaft 122 to 2000 RPM at the first clutch 136, and the second reduction gearing 142 may convert the 15 000 RPM of the rotor shaft 124 to 2000 RPM at the second clutch 138. These values are provided solely as one potential example, for illustrative purposes, and do not represent the values of a specific power plant. This potential example could have a piston engine or a rotary engine as the thermal engine for instance. In an alternate embodiment, a gas turbine engine may be provided as the thermal engine for instance with additional reduction gearing as required.

In some embodiments, it may be suitable to design the power plant for the electric motor to rotate at relatively high rotation speeds, since in some cases, for a same volume and weight of electric motor, a greater power and/or efficiency may be achieved by the electric motor if it rotates at higher speeds, potentially achieving greater power density. This may particularly be beneficial in aircraft applications. By using two different reduction gearboxes, the rotation speed of the electric motor may be optimized independently of the optimization of the rotation speed of the thermal engine.

In this embodiment, the output shaft 112 extends axially across the electric motor 120. This configuration can be beneficial in exposing the electric motor 120 at the front of the aircraft, to the airflow generated at the propeller or other air mover, which may be useful in cooling the electric motor 120 during operation, for instance.

The first reduction gearing 140, the second reduction gearing 142, or both, may be embodied in the form of epicyclic gearing (sometimes alternately referred to as planetary gearing). In alternate embodiments, the first reduction gearing may be omitted, the second reduction gearing may be omitted, or both the first reduction gearing and the second reduction gearing may be omitted. Epicyclic gearing includes a sun gear 150, 160 coaxial to a ring gear 152, 162, a plurality of planet gears 154, 164 meshed between the sun gear 150, 160 and the ring gear 152, 162, and a carrier 156, 166 coaxial to the sun gear 150, 160 and the ring gear 152, 162. The planet gears 154, 164 are rotatably mounted to the carrier 156, 166, around individual rotation axes which are radially offset from the central axis (e.g., axis of thermal engine shaft 122 or axis of rotor shaft 124). Two or three of the sun gear 150, 160, ring gear 152, 162, and carrier 156, 166 may rotate around the central axis (e.g., axis of thermal engine shaft 122 or axis of rotor shaft 124). In the illustrated embodiment, the ring gears 152, 162 of both epicyclic gearings are fixed relative to a casing, cowling, housing 119 or other non-rotary structure of the power plant, the sun gears 150, 160 are made integral to the thermal engine shaft 122 and to the rotor shaft 124, respectively, and the carriers 156, 166 are directly coupled to the first clutch 136 and second clutch 138, respectively. In alternate embodiments, the configuration of the epicyclic gearing may be different, such as the carrier or sun being fixed instead of the ring gear, the sun being coupled to a clutch rather than to a shaft, etc.

Epicyclic gearing may offer certain features by contrast with other forms of gearing. In particular, epicyclic gearing may be particularly suitable to coaxial arrangements such as the ones presented in FIGS. 1 and 2. Epicyclic gearing may also offer a certain degree of compactness and/or limited weight for given specifications of reduction, durability, cost, etc.

In the embodiment presented in FIG. 2, it will be noted that a first epicyclic gearing is provided between the thermal engine 118 and the first clutch 136, and a second epicyclic gearing is provided between the electric motor 120 and the second clutch 138. The expression "between" is used in this paragraph relative to the force transfer path, but it will also be noted that most of the weight of each epicyclic gearing is disposed geometrically between those components as well. Accordingly, the first clutch 136 and the second clutch 138 may be said to be disposed between the first epicyclic gearing and the second epicyclic gearing relative to the axis.

In the embodiment presented in FIG. 2, the first clutch 136 and second clutch 138 are sprag clutches. Sprag clutches may offer the feature of being relatively robust, reliable and compact. In the event of sudden stoppage of the electric motor and/or of the thermal engine, the corresponding sprag clutch will disengage automatically. The electric motor 120 or the thermal engine 118 may also automatically disengage when they generate less rotation speed than the other. In some cases, this automatic disengagement feature may be desired, whereas in others, it may not be desired. The third clutch 128 may be provided to avoid the individual automatic disengagement feature of either one of the electric motor 120 and thermal engine 118 in situations where it is not desired to disengage the electric motor 120 from the thermal engine 118.

In the embodiment presented in FIG. 2, the third clutch 128 is an active clutch, and its engagement and disengagement may be actively controlled via an actuator 144. In some embodiments, the third clutch 128 can have a component which can slide in the orientation of the axis of the output shaft 112, based on the action of the actuator 144, in a manner to perform the selective engagement or disengagement action between the electric motor 120 and the thermal engine 118.

In the embodiment presented in FIG. 2, the third clutch 128 can operate on the basis of the tangential (circumferential) engagement between axially overlapping components, and thus as a dog clutch, as opposed to a friction clutch. For instance, an outer portion of the first clutch 136 can have a first male spline coaxial with the output shaft 112, the outer portion of the second clutch 138 can have a second male spline coaxial with the output shaft 112, and the third clutch 128 can have a sliding component in the form of a sleeve 128*a* with an internal female spline coaxial with the output shaft 112. During an example "engaged" operating condition, the female spline may axially overlap, and be engaged with both the first male spline and the second male spline. To disengage the third clutch 128, the actuator can slide the sleeve 128*a*, and thus the female spline, in the axial orientation, to disengage the female spline from the first male spline or from the second male spline, thereby disengaging the thermal engine 118 from the electric motor 120. It will be noted that in such an embodiment, while disengagement can take place at any time, to perform the re-engagement of the third clutch 128, the output of the first reduction gearing and the output of the second reduction gearing may need to rotate at the same speed. Re-engagement may be controlled by computer 32.

The configuration presented in FIG. 2 can be referred to as an in-line gearing configuration. The in-line gearing configuration may alloy a more compact and minimum frontal area beneficial for aero engine. For failure scenarios, the sprag clutches can allow to decouple the thermal engine or electric motor when stopped allowing the other engine to continue. The electric motor can be used as a starter when the thermal engine is stopped by engaging the two-gearbox stage. The configuration can allow different reduction for thermal and electric motor with one output shaft at optimum speed. Once the thermal engine has started, the actuator can be disengaged.

Figure 3:
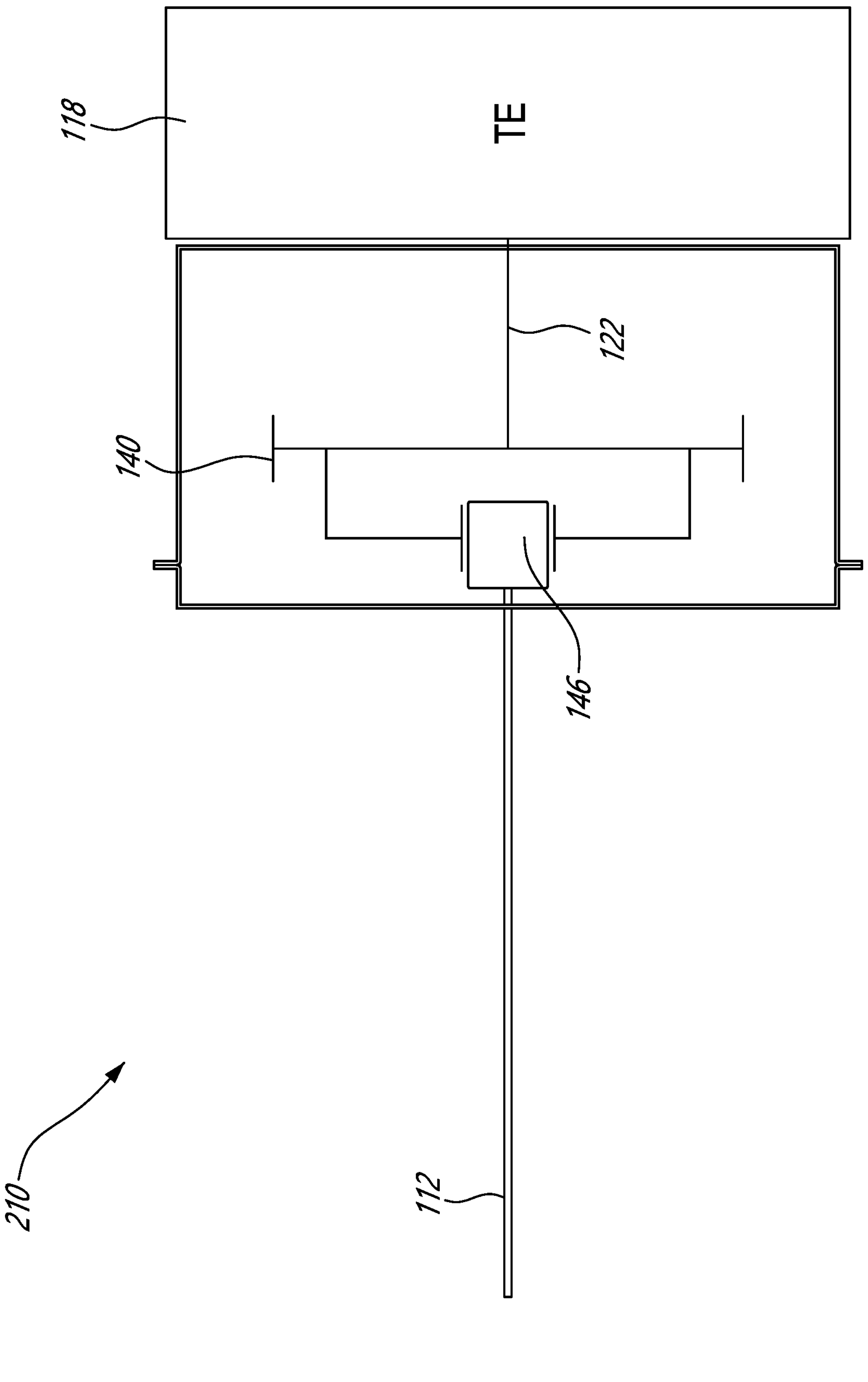
FIG. 3 is a schematic representation of an example thermal engine power plant.

FIG. 3 presents another embodiment of a power plant 210. In this example, the power plant 210 uses many of the same parts as the power plant 110 of FIG. 2, namely the thermal engine 118, the first reduction gearing 140 and the output shaft. The electric motor 120, second reduction gearing 142 and clutches 136, 138, 128, may be omitted and the output of the first reduction gearing 140 may be directly coupled to the output shaft 112 via a spline 146. Accordingly, using some same parts, two embodiments may be produced, including an embodiment such as shown in FIG. 2 and having an electric motor, and an embodiment such as shown in FIG. 3 and omitting the electric motor. In such an embodiment, it may be preferred to use a different housing or cover to house the first reduction gearing 140.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A hybrid aircraft power plant comprising:

an output shaft connectable to a load, the output shaft rotatable about an axis;

a thermal engine having a thermal engine shaft coaxial with the output shaft;

an electric motor having a rotor shaft coaxial with the output shaft;

a first clutch operable to engage the thermal engine shaft with the output shaft;

a second clutch operable to engage the rotor shaft with the output shaft; and a third clutch operable to engage the thermal engine shaft with the rotor shaft, wherein the first clutch, second clutch and third clutch disposed axially between the electric motor and the thermal engine, relative to the axis; and wherein the third clutch has a sleeve coaxial to the first clutch and second clutch, the sleeve having a female spline engaged with a male spline of the first clutch and with a male spline of the second clutch, further comprising an actuator operable to slide the sleeve along the axis and disengage the female spline from the male spline of the first clutch or from the male spline of the second clutch.

2. The hybrid aircraft power plant of claim 1, wherein the first clutch and the second clutch are overrunning clutches.

3. The hybrid aircraft power plant of claim 2, wherein the overrunning clutches are sprag clutches.

4. The hybrid aircraft power plant of claim 1, comprising a first reduction gearing coupled between the thermal engine shaft and the first clutch.

5. The hybrid aircraft power plant of claim 4, comprising a second reduction gearing coupled between the thermal engine shaft and the second clutch.

6. The hybrid aircraft power plant of claim 5, wherein the first reduction gearing and the second reduction gearing are epicyclic gearing.

7. The hybrid aircraft power plant of claim 6, wherein the epicyclic gearing each have a sun gear coaxial to a ring gear, a plurality of planet gears meshed between the sun gear and the ring gear, and a carrier coaxial to the sun gear and the ring gear, the sun gears coupled to the thermal engine shaft and the rotor shaft, respectively, and the carriers coupled to the first clutch and second clutch, respectively.

8. An aircraft power plant comprising:

an output shaft connected to an air mover or load, the output shaft rotatable about an axis;

a thermal engine having a thermal engine shaft;

an electric motor having a rotor shaft;

a first clutch operable to engage the thermal engine shaft with the output shaft, the first clutch being a passive one-way clutch;

a second clutch operable to engage the rotor shaft with the output shaft, the second clutch being a passive one-way clutch; and an epicyclic gearing coupled between the thermal engine shaft and the first clutch or between the rotor shaft and the second clutch, the epicyclic gearing having a sun gear coaxial to a ring gear, a plurality of planet gears meshed between the sun gear and the ring gear, and a carrier coaxial to the sun gear and the ring gear, the sun gear coupled to the thermal engine shaft or the rotor shaft, and the carrier coupled to the first clutch or second clutch;

wherein the first clutch and second clutch disposed axially between the electric motor and the thermal engine, relative to the axis.

9. The aircraft power plant of claim 8, wherein the first clutch and the second clutch are sprag clutches.

10. The aircraft power plant of claim 8 further comprising a third clutch operable to engage the thermal engine shaft with the rotor shaft.

11. The aircraft power plant of claim 10, wherein the third clutch is a dog clutch.

12. The aircraft power plant of claim 8, comprising an epicyclic gearing coupled between the thermal engine shaft and the first clutch.

13. The aircraft power plant of claim 8, comprising an epicyclic gearing coupled between the thermal engine shaft and the second clutch.

14. The aircraft power plant of claim 8, wherein a rotor of the electric motor surrounds the output shaft and axially overlaps the output shaft, the electric motor disposed between the thermal engine and the air mover.

15. A gearbox for a hybrid power plant, the gearbox comprising:

a common housing;

an output shaft extending into the common housing;

a thermal engine shaft extending into the common housing, concentric to the output shaft;

a rotor shaft extending into the common housing, concentric to the output shaft;

a first clutch disposed in the common housing and operable to engage the thermal engine shaft with the output shaft;

a second clutch disposed in the common housing and operable to engage the rotor shaft with the output shaft; and a third clutch disposed in the common housing and operable to engage the thermal engine shaft with the rotor shaft.

16. The gearbox of claim 15, comprising a first epicyclic gearing coupled between the thermal engine shaft and the first clutch and a second epicyclic gearing coupled between the thermal engine shaft and the second clutch, the first epicyclic gearing and the second epicyclic gearing disposed in the common housing.

17. The gearbox of claim 16, wherein the epicyclic gearing each have a sun gear coaxial to a ring gear, a plurality of planet gears meshed between the sun gear and the ring gear, and a carrier coaxial to the sun gear and the ring gear, the sun gears coupled to the thermal engine shaft and the rotor shaft, respectively, and the carriers coupled to the first clutch and second clutch, respectively.

18. The gearbox of claim 15, wherein the first clutch and second clutch are sprag clutches, wherein the third clutch has a sleeve coaxial to the first clutch and second clutch, the sleeve having a female spline engaged with a male spline of the first clutch and with a male spline of the second clutch, further comprising an actuator operable to slide the sleeve along an axis of the first clutch and second clutch and disengage the female spline from the male spline of the first clutch or from the male spline of the second clutch.

19. A hybrid aircraft power plant comprising:

an output shaft connectable to a load, the output shaft rotatable about an axis;

a thermal engine having a thermal engine shaft coaxial with the output shaft;

an electric motor having a rotor shaft coaxial with the output shaft;

a first clutch operable to engage the thermal engine shaft with the output shaft;

a second clutch operable to engage the rotor shaft with the output shaft;

a third clutch operable to engage the thermal engine shaft with the rotor shaft;

a first reduction gearing coupled between the thermal engine shaft and the first clutch, and a second reduction gearing coupled between the thermal engine shaft and the second clutch, wherein the first clutch, second clutch and third clutch disposed axially between the electric motor and the thermal engine, relative to the axis; and wherein the first reduction gearing and the second reduction gearing are epicyclic gearing.

20. The hybrid aircraft power plant of claim 19, wherein the epicyclic gearing each have a sun gear coaxial to a ring gear, a plurality of planet gears meshed between the sun gear and the ring gear, and a carrier coaxial to the sun gear and the ring gear, the sun gears coupled to the thermal engine shaft and the rotor shaft, respectively, and the carriers coupled to the first clutch and second clutch, respectively.

* * * * *